United States Patent

[11] 3,587,389

| [72] | Inventor | Alfred Kreimer |
| | | Cincinnati, Ohio |
| [21] | Appl. No. | 821,820 |
| [22] | Filed | May 5, 1969 |
| [45] | Patented | June 28, 1971 |
| [73] | Assignee | G. A. Gray Company |
| | | Cincinnati, Ohio |

[54] INDEXING DEVICE FOR PLANER-TYPE MILLING MACHINES
13 Claims, 8 Drawing Figs.

| [52] | U.S. Cl. ................................................ | 90/17, 90/15 |
| [51] | Int. Cl. ................................................ | B23c 1/12 |
| [50] | Field of Search ...................................... | 90/164, 56, 16, 17, 15; 277/25; 51/166.7 |

[56] References Cited
UNITED STATES PATENTS

| 1,775,084 | 9/1930 | Beaman .................... | 90/164 |
| 3,037,429 | 6/1962 | Schurger .................... | 90/16 |
| 3,448,656 | 6/1969 | Bottger et al. ................ | 90/17 |

*Primary Examiner*—Gil Weidenfeld
*Attorney*—Melville, Strasser, Foster and Hoffman ABSTRACT: Indexing device for positioning cutter bearing spindles in a planer-type milling machine. Each said spindle is mounted on a rotatable indexing mechanism which turns a cutting element on said spindle to a predetermined number of compass settings relative to the axis of said spindle. The indexing mechanism is characterized by a coupling having a first part rotatable in only a single direction, and a second part rotatable in two directions. The rotation of the spindle is effected by said coupling which in turn is activated by an hydraulic cylinder.

INVENTOR/S
ALFRED KREIMER

BY Melville, Strasser, Foster and Hoffman
ATTORNEYS

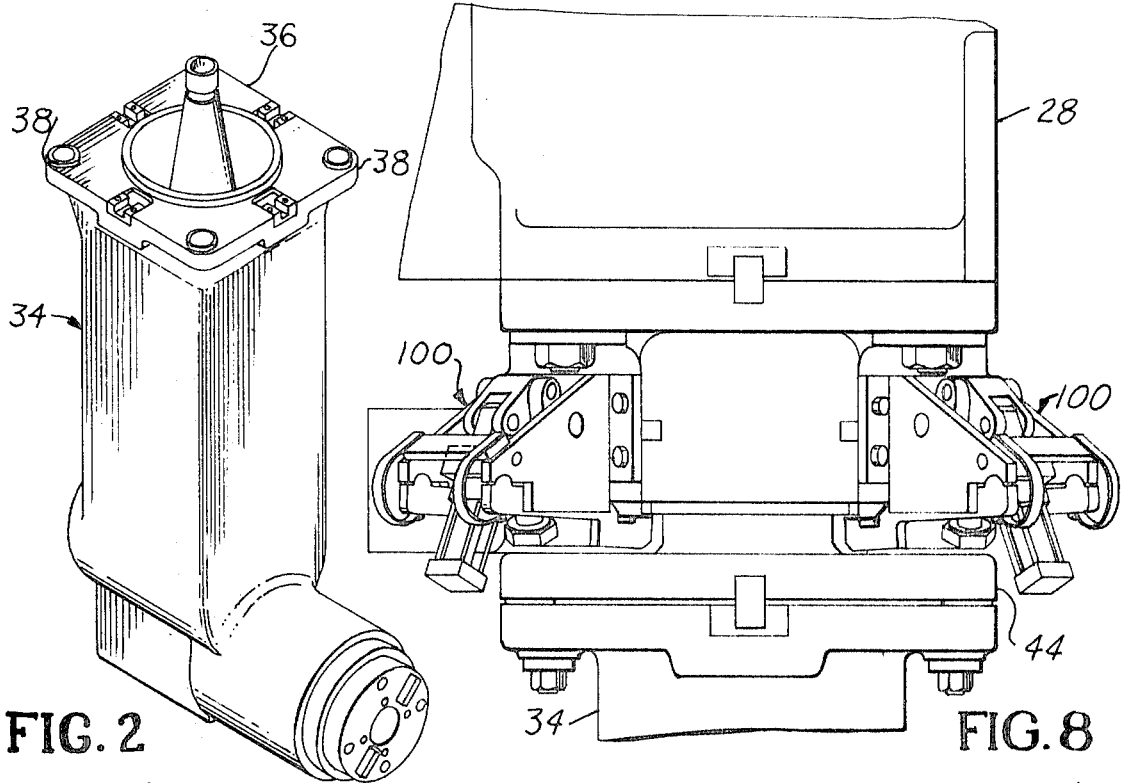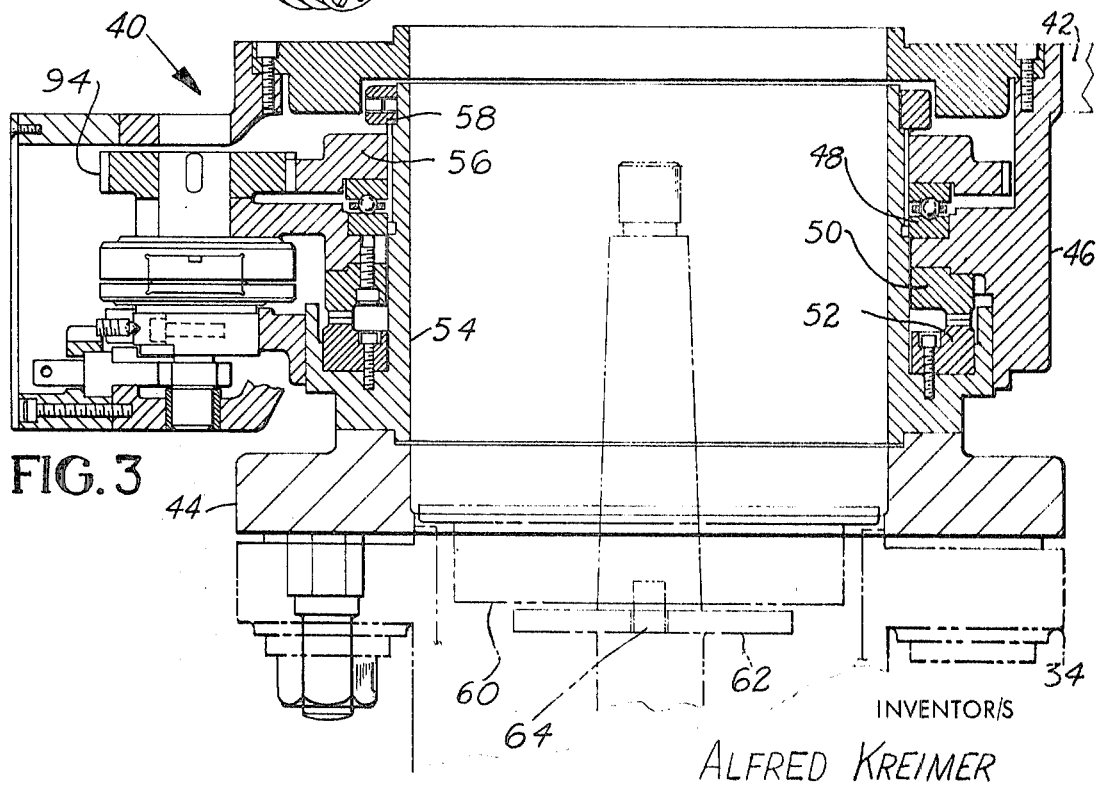

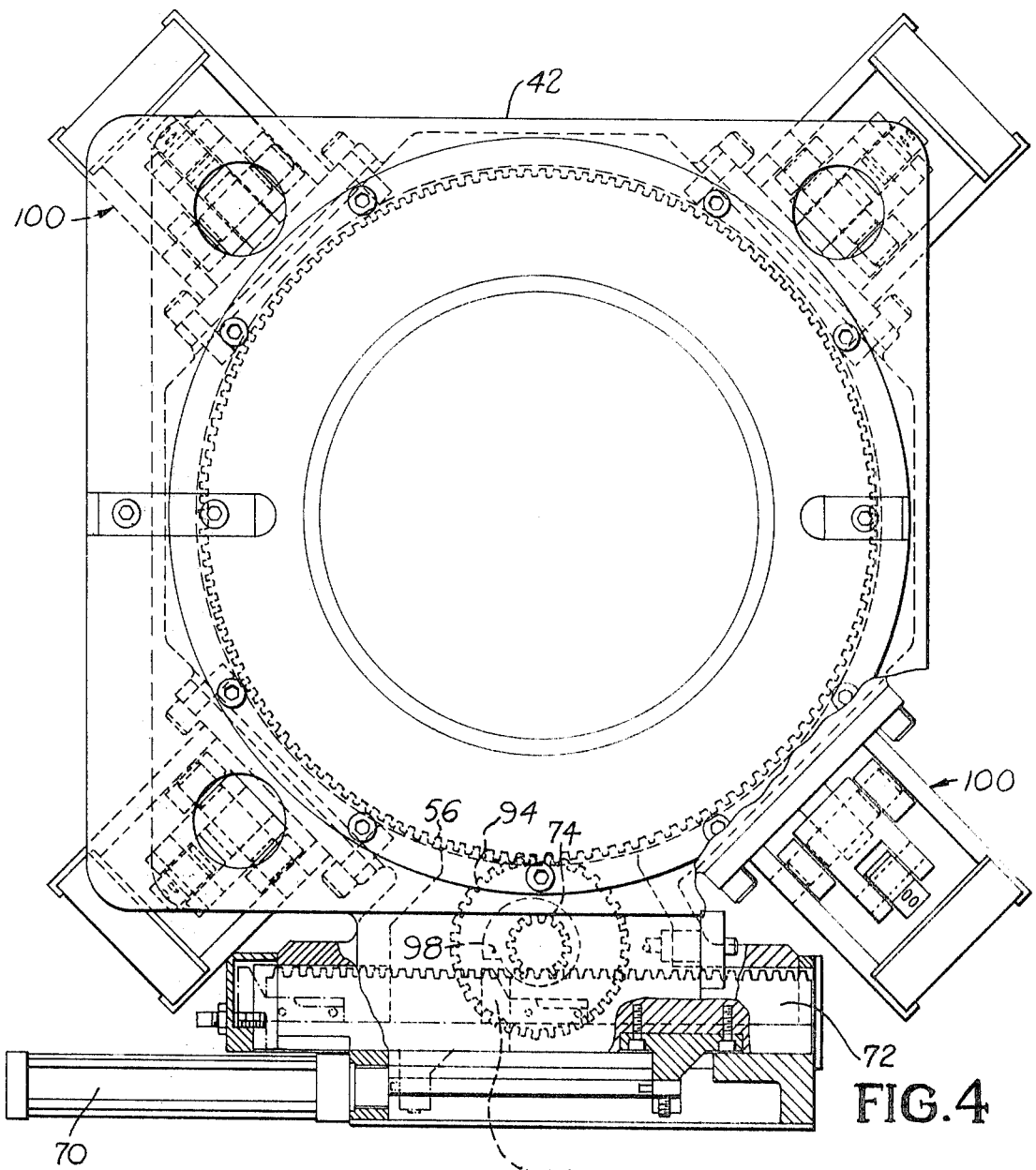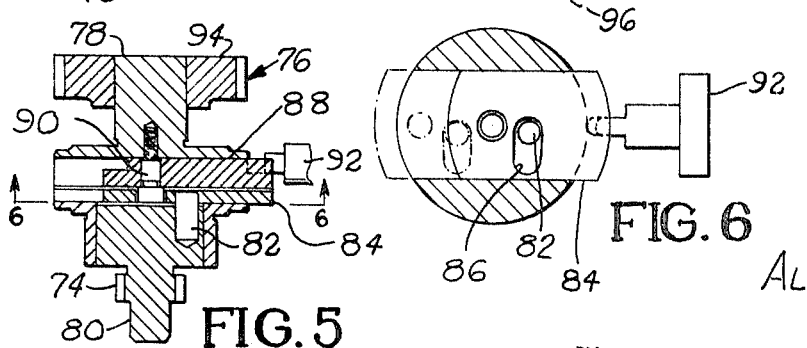

INDEXING DEVICE FOR PLANER-TYPE MILLING MACHINES

BACKGROUND OF THE INVENTION

This invention relates to a unique indexing mechanism for use on planer-type milling machines. Specifically, the invention covers a remotely controlled indexing device which is efficient and adapted to rapid position changing of spindle attachments.

Heretofore, the typical planer-type milling machine included only a bed having a reciprocating table thereon, which moved the workpiece beneath a plurality of milling spindles. Above this, the milling spindles were mounted on motorized housings secured to vertical and horizontal rails for movement thereover.

The cutting of the workpiece was realized by moving same back and forth on the reciprocating table such that the cutters on the vertically mounted milling spindles machined the horizontal surfaces of the workpiece. A similar action by the horizontally mounted cutters machined the workpiece surfaces perpendicular to the table surface.

However, for most items to be machined, it was necessary to machine surfaces other than the two described above. Therefore, angle attachments for the milling spindles were developed for the machine as a means to accomplish the desired task. Unfortunately, the prior developments were cumbersome and time consuming to position by the operator for proper machining. Such is not the problem with the present invention which provided for a remotely controlled indexing device for the machine.

SUMMARY OF THE INVENTION

In brief, this invention contemplates the provision of a unique indexing mechanism for controlling the cutter holding spindle attachments of a planer-type milling machine.

More specifically, the indexing mechanism which is mounted concentrically with the milling spindle on the face of the milling head, comprises a housing secured to said milling head, and a second concentric member, a portion of which is rotatable with respect to said housing, for receiving an angle attachment for the milling spindle. The housing is bolted to the face of the milling head and projects axially from said face. Within said housing projection there is provided a central sleeve which carries one of a pair of engaging radial splines which aligns the mechanism.

The indexing motion is provided by an hydraulic cylinder, which operates through a coupling to drive an annular indexing gear and positions the device at the desired location. In the preferred embodiment, the devices are designed for precision indexing to any of four equally spaced circumferential positions. However, it is contemplated that the gear ratio between the coupling and annular gear may be designed to accommodate any discrete number of compass settings or positions for the indexing mechanism.

BRIEF DESCRIPTION OF DRAWINGS

FIG. 2 is an enlarged perspective view of a typical spindle attachment used in varying the cutting position of a planer-type milling machine.

FIG. 3 is an enlarged sectional view of the indexing mechanism constructed according to the teachings of this invention, which mechanism is mounted on the planer-type milling machine to receive the spindle attachment of FIG. 2.

FIG. 4 is a top view of the indexing mechanism shown in FIG. 3 and emphasizing the means for moving said mechanism. Portions of the structure have been illustrated with dotted lines and in section to illustrate the details of the mechanism.

FIGS. 5 and 6 are sectional views showing details of the mechanism shown in FIG. 4.

FIG. 8 is a perspective view of the clamping mechanism shown in FIG. 7, showing the relationship of the clamping device to the structure illustrated in FIG. 1.

DETAILED DESCRIPTION OF PREFERRED EMBODIMENT

Figure 1:
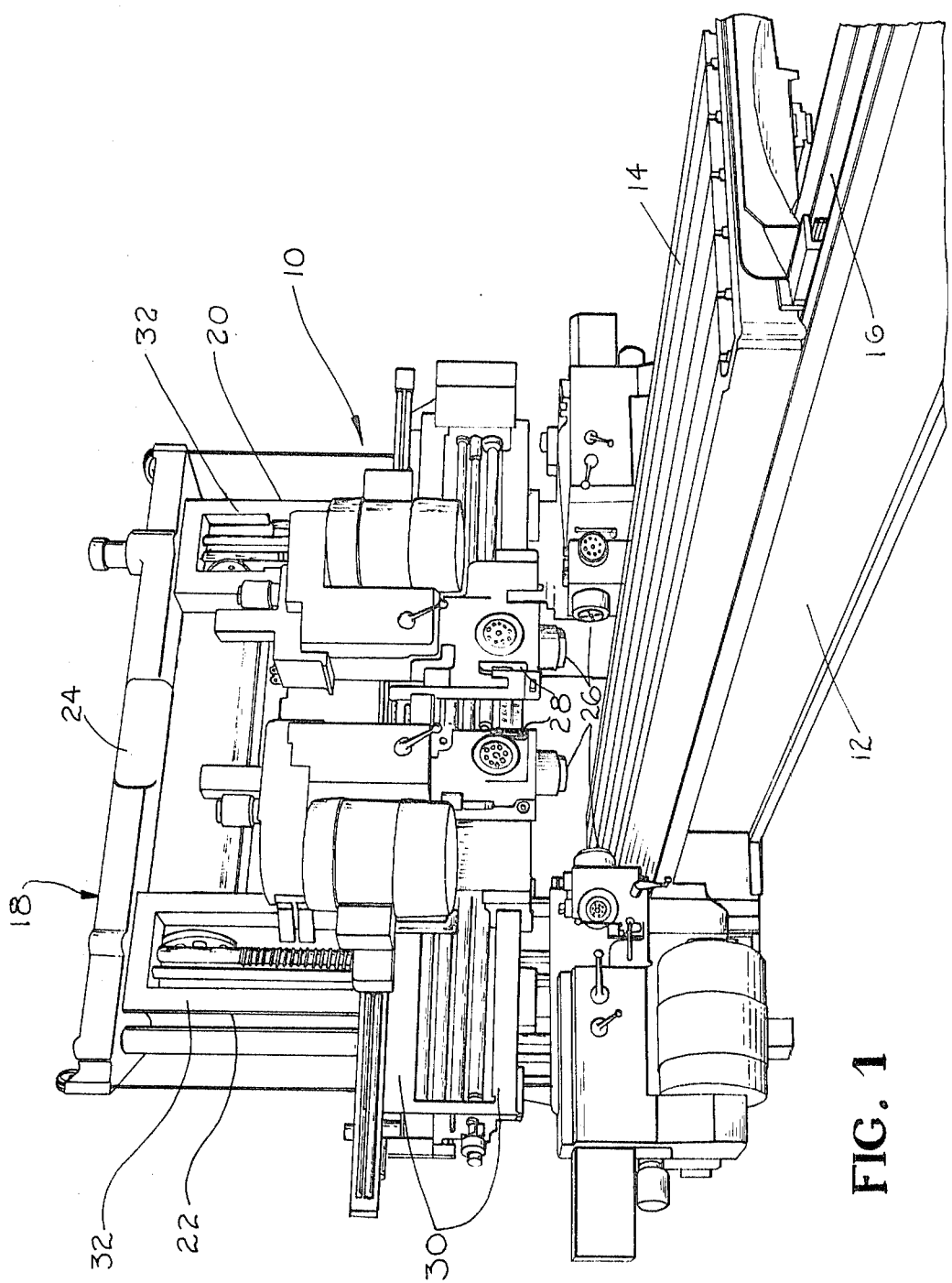
FIG. 1 is a perspective view of a typical planer-type milling machine to which this invention is readily adapted.

Turning now to a more detailed description of the invention, particularly with regard to the accompanying FIGS. it will be noted that FIG. 1 illustrates a typical planer-type milling machine 10 to which this invention relates. A typical machine includes a bed 12, which supports a reciprocating table 14 on precise slideways 16. At the mid point of the bed 14, there is provided a housing 18 which consists of vertical housing members 20 and 22 connected to each other by means of top member 24. To each said vertical member, milling spindles 26 are mounted in milling heads 28 to receive milling cutters (not shown) for machining of a workpiece secured to said table 14. Horizontal and vertical movement for the milling spindles and milling heads is achieved by sliding along railways 30 or machined housing ways 32. This general construction is known in the art and forms no limitation on this invention. Its purpose at this point is to merely establish the relationship of the components of this invention to the machine with which it is applicable.

It should be apparent from this description that certain disadvantages lie with the structure when it comes to machining the surface of a given workpiece. For example, the vertical spindles containing the milling cutters machine the horizontal surfaces parallel to the table top. On the other hand, the milling cutters mounted in the horizontal spindles machine the vertical surfaces perpendicular to the table top. However, for most workpieces it is necessary to machine surfaces other than the two noted above. Therefore, angle attachments for the milling spindles were developed for this purpose. FIG. 2 shows a persepective view of a typical angle attachment 34. By the use of attachment 34, an auxiliary spindle mounted in a plane perpendicular to that of the milling spindle 26 can be provided. Furthermore, this auxiliary spindle or attachment 34 may be turned to any point of the compass relative to the axis of the main spindle 26.

It will be observed in FIG. 2 that the flange 36 of the auxiliary spindle 34 has been provided with a symmetrical square pattern such that each corner 38 has been provided with a bolt receiving hole for mounting on the milling head 28. In other words, the auxiliary spindle may be remounted in any one of the four mounting positions by merely removing the aforementioned bolts and turning the auxiliary spindle 34 to the newly selected position. Unfortunately, in many workpieces it is necessary to machine the workpiece in each of the four positions of the attachment. Typically this requires a great deal of time by the operator to mechanically move or index the attachment by the method described above.

The present invention provides a unique system for mechanically indexing the auxiliary attachment to any number of preselected positions (normally four positions), without having to remove and remount the auxiliary attachment 34. FIG. 3 shows an enlarged sectional view of the novel indexing device of this invention.

Before considering the unique system or indexing device 40 in detail, it will be observed in FIG. 3 that said device is characterized at its upper part by a flange 42 for bolting to the milling head 28. The flange 42 is shown in phantomed lines in FIG. 3 at the upper right thereof. For a further perspective of the flange 42, see FIGS. 4 and 7. Finally, at the base of device 40 there is provided a rotatable flange 44 to which the angle attachment 34 is secured. In other words, the indexing device 40 is positioned between the regular components, namely, the milling head and the auxiliary spindle.

The upper flange 42, which includes member 46, is seen to extend downward to encompass the indexing mechanism such as the turn table bearing 48 and the upper half of a precision radial spline 50. The said upper half of spline 50 is stationary and aligned so as to be concentric with and perpendicular to the primary spindle axis. While the radial spline constitutes a device known in the art, and hence its construction known, it nevertheless is a device which achieves both circumferential and radial alignment to a high degree of precision by means of a special curved-toothed configuration. The lower half of the radial spline 52 is attached to the rotatable flange 44. Concentric with the member 46 there is provided a central sleeve 54 which extends upward from the lower flange 44 to carry the indexing gear 56 and a retaining nut 58. The latter components will be discussed in more detail later.

The milling spindle 60 is carried in the milling head 28 by a nonrotating, cylindrical quill. This quill may be extended beyond the face of said milling head to position a cutter or in this structure to connect to the driving arbor 62 of the angle attachment 34 secured to the flange 44. Driving torque is transmitted from the milling spindle 60 to the angle attachment driving arbor 62 through drive keys 64 mounted in the face of the milling spindle 60. The drive keys 64 are deep enough such that the radial splines 50 and 52 may be disengaged without disconnecting the drive keys 64.

The opposing radial splines 50 and 52 establish the exact locations desired of the lower flange 44 when they are engaged and tightly clamped. However, in order to move the lower flange, and hence the angle attachment 34, said splines must be unclamped and disengaged. The present invention contemplates a novel system for moving the lower flange to a different position such that the opposing radial splines 50 and 52 can reengage without tooth interference.

FIGS. 4, 5 and 6 illustrate the unique mechanism whereby the repositioning of the lower flange 44 is accomplished. Specifically, the indexing motion is provided by hydraulic cylinder 70 which moves an elongated toothed rack 72 in a reciprocating motion. The rack 72 engages with a pinion 74 which is attached to a special coupling 76. Coupling 76 comprises an upper portion 78 and a lower rotatable member 80 aligned along the same axis and which are connected through a dual slide device confined in matching slots in the upper coupling 78 and the lower coupling 80. A pin 82 in the lower rotatable member 80 engages cam plate 84 in an elongated slot 86. The upper portion 78 of the coupling 76 encloses a drive plate 88 which is parallel to the cam plate 84 in the lower rotatable member 80. Drive plate 88 contains a shoulder pin 90 which maintains alignment between cam plate 84 and drive plate 88. A stationary locating pin 92 prevents rotation of the drive plate 88 and the upper portion 78 until the drive plate 88 has moved left [as viewed in the FIGS.] a sufficient amount to disengage the locating pin 92.

At this juncture it may be helpful to review the action of the coupling as shown in FIGS. 5 and 6. For example, when the cam plate 84 and the drive plate 88 are in their extreme right position [as viewed in the FIGS.], the shoulder pin 90 is disposed along the axis of the coupling portions 78 and 80. When in this position, the lower portion 80 of the coupling 76 can rotate independently of the upper portion 78, which is being restrained from rotation by the locating pin 92. Now, as the cam plate 84 and the drive plate 88 shift to the left, the shoulder pin 90 is misaligned from said axis and the respective coupling portions 78 and 80 are effectively keyed together by the cam plate and the drive plate 88. Further, this leftward movement of the drive plate disengages the locating pin 92 thereby permitting the rotation of both the coupling portions by the application of torque to the lower coupling member 80.

Returning now to the motion mechanism in more detail, when the hydraulic cylinder 70 is activated and extends, the rack 72 turns the pinion 74, and hence the lower coupling portion 80, in a clockwise direction, looking upward, [reference FIGS. 4 and 6]. When the lower coupling portion 80 turns in said clockwise direction, pin 82 moves said cam plate and said drive plate to the position shown in FIG. 6 in phantom lines. Up to this point there is no motion of the upper member 78 of the coupling. However, at this point with the continuance of the clockwise movement caused by the hydraulic cylinder 70, the upper member 78 now moves with the lower coupling portion 80 through one complete revolution to return to the position shown in FIG. 6 in phantom lines. Coincident with this movement, the upper portion 78, to which is secured a pinion 94, drives the indexing gear 56. The number of teeth in the pinion 94 and the indexing gear 56 are selected so that a complete revolution of said pinion will turn said indexing gear a predetermined number of degrees. For example, if the ratio between the teeth is 1:4 pinion and indexing gear respectively, a complete revolution of the pinion will cause the indexing gear to turn 90°. Accordingly, it will be appreciated that the selection of the ratio will determine the number of ultimate positions in which the auxiliary spindle, whose rotation is governed by the lower flange 44 which in turn is connected to the indexing gear, may be positioned. Preferably, the ratio should be 1:4. In any case, as the mechanism reaches this point, the cam plate 84 and the drive plate 88 are in the position shown in FIG. 6 by the phantom lines. At this time, a shoulder 96 at the inner end of the rack 72 is engaged at 98 by a matching shoulder on the lower coupling portion 80 to stop the rotation of the indexing motion at the desired location. For practical application, the location of the stop shoulder 96 may be adjusted relative to the rack 72 to achieve optimum operation.

To prepare the indexing mechanism for a later change, the hydraulic cylinder 70 is then retracted and lower coupling portion 80 is caused to turn counterclockwise, looking upward [reference FIGS. 4 and 6]. Coincident with this counterclockwise movement, the cam plate 84 and the drive plate 88 are returned to the position shown in solid lines in FIG. 6. In this position, shoulder pin 90 is again aligned with the axis of the coupling such that cam plate 84 can turn without imparting motion to the drive plate 88, the latter being held in position by locating pin 92. As the cylinder 70 continues to retract, the lower coupling portion 80 and the cam plate 84 continue to rotate in a counterclockwise direction while the drive plate 88 and the upper member 78 remain stationary. This action continues until the cylinder 70 has been restored to its initial position, and the coupling components have returned to their starting position. While the foregoing may appear rather complex, the movement of the parts may be summarized in the following manner. In indexing the mechanism, the lower portion 80, cam plate 84, and drive plate 88 are turned approximately 180° clockwise where they are joined for a complete revolution by the upper portion 78. To retract or return the cylinder for a new position later, the lower portion 80, cam plate 84, and drive plate 88 are turned counterclockwise approximately 180°. At this point, only the lower portion 80 and the cam plate 84 are turned an additional revolution thereby bringing all of the components back to their original position.

Figure 7:
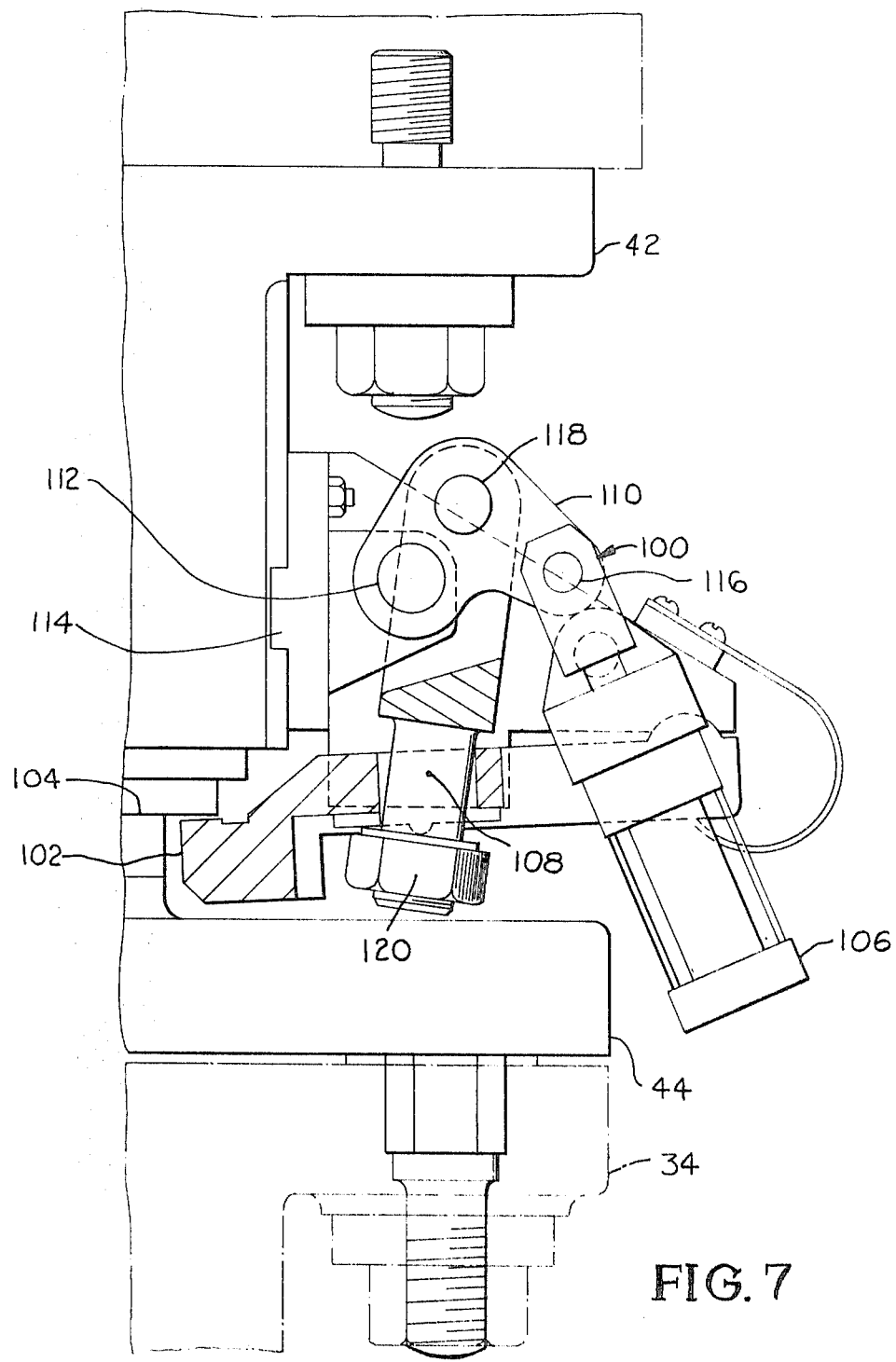
FIG. 7 is a side view, a portion of which has been sectioned, showing the clamping mechanism for the indexing device of this invention.

The pressures of the cutting operation and the size of the workpiece involved are of a magnitude that requires stability in the components of the machine. To give stability or rigidity to the angle attachment with respect to the milling head, a special clamping mechanism has been provided for the device. FIGS. 7 and 8 show the novel clamping mechanism of this invention. FIG. 7 illustrates most of the details of the clamping mechanism 100 whereas FIG. 8 is a perspective view showing the general relationship of the components of the machine. While the number of clamping devices may vary according to the construction of the milling machine, the preferred arrangement includes four of the said devices, one at each corner spaced at 90° from one another. As observed in the latter FIGS., the actual clamping between the upper flange 42 and the lower flange 44 is accomplished by urging member 102 against the surface 104. This action by the clamping member 102 is accomplished by a mechanism which includes the cylinder 106, acting on link 108 through the toggle link 110. The pivot pin 112 is attached to the nonrotatable flange of the indexing device, through member 46 and through brackets 114. The motion of toggle link 110 pivots the pin 112 and pin 116, the latter pin being connected to the rod of cylinder 106. The clamping link 108, as best seen in FIG. 7, is attached to the toggle link 110 through the pin 118. It will thus be seen that as the cylinder 106 extends, the toggle link 110 moves in a counterclockwise direction around pin 112. As the axis of the clamping link 108 approaches the center of the pin 112, the toggle action develops a very high tension force in the clamping link 108. This force is transmitted to the clamping surface 104 through the clamping member 102 thereby securing the upper and lower flanges of the indexing device. Since a plurality of the clamping devices 100 is contemplated for securing the indexing device of this invention for each angle attachment, an adjustment nut 120 is provided on the link 108. That is, by adjusting said nut along the axis of the link 108, it is possible to insure an equal clamping force in each of the several clamping devices.

While it is indicated above that the preferred number of positions desired for the mechanism is four, it should be understood that any number of discrete circumferential positions may be engineered with this system. In view of this modification, and others which may become apparent to those skilled in the art, no limitation is intended to be imposed herein except as set forth in the appended claims.

The embodiments of the invention in which an exclusive property or privilege is claimed are defined as follows:

I claim:

1. In a planer-type milling machine having an attachment for securing a cutting element and means for activating said cutting element, the improvement comprising in combination therewith, means mounted intermediate said activating means and said attachment for indexing the attachment to a plurality of discrete circumferential positions, said indexing means comprising a coupling composed of a first part rotatable in only a single direction and a second part rotatable in two directions, whereby each said coupling part is aligned along a common axis, and means for rotating said coupling in said single direction to cause rotation of said attachment to a preselected discrete position.

2. The improved planer-type milling machine as claimed in claim 1 wherein said coupling includes a dual slide mechanism disposed between said first and second coupling parts thereby permitting the separate rotation of said coupling parts.

3. The improved planer-type milling machine as claimed in claim 2 wherein each said change of the attachment from one discrete position to another defines the indexing cycle, and that during said indexing cycle said coupling first part will rotate 360° and said coupling second part will rotate approximately 540°.

4. The improved planer-type milling machine as claimed in claim 3 wherein said indexing means includes an annular gear fixed with respect to said attachment for the rotation thereof.

5. The improved planer-type milling machine as claimed in claim 4 wherein said coupling includes a pinion connected to said first part and mating with said annular gear to effect the rotation thereof, whereby the number of teeth on said annular gear compared to the teeth on said pinion is a simple ratio.

6. The improved planer-type milling machine as claimed in claim 5 wherein said simple ratio is 4:1.

7. The improved planer-type milling machine as claimed in claim 2, wherein said dual slide mechanism includes adjacent upper and lower plates between said coupling parts, which plates are rotatable with said coupling parts.

8. The improved planer-type milling machine as claimed in claim 7 whereby during said indexing cycle the said plates rotate approximately 540° in said first direction with said second coupling part.

9. The improved planer-type milling machine as claimed in claim 8 whereby during the adjustment of the coupling for a new indexing cycle said upper plate rotates in a reverse direction approximately 180°, while the said lower plate and second coupling part rotate in the reverse direction approximately 540°.

10. The improved planer-type milling machine as claimed in claim 2, wherein said means for rotating said coupling includes a cylinder activating an elongated toothed rack.

11. The improved planer-type milling machine as claimed in claim 10 including a pinion mounted on said coupling second part, whereby said rack engages with said pinion to cause the rotation thereof.

12. The improved planer-type milling machine as claimed in claim 1, including at least one clamping device for securing said indexing mechanism to said means for activating said cutting element.

13. The improved planer-type milling machine as claimed in claim 2, including at least one clamping device for securing said indexing mechanism to said means for activating said cutting element.